US008099120B2

(12) United States Patent
Drozt et al.

(10) Patent No.: US 8,099,120 B2
(45) Date of Patent: Jan. 17, 2012

(54) METHOD AND DEVICE FOR ENABLING SELECTIVE PRIVACY IN A PUSH TO TALK (PTT) WIRELESS GROUP COMMUNICATION SESSION

(75) Inventors: Peter M. Drozt, Prairie Grove, IL (US);
Anatoly Agulnik, Deerfield, IL (US);
Johanna A. Wild, Bavaria (DE)

(73) Assignee: Motorola Solutions, Inc., Schaumburg, IL (US)

( * ) Notice: Subject to any disclaimer, the term of this patent is extended or adjusted under 35 U.S.C. 154(b) by 482 days.

(21) Appl. No.: 12/402,766

(22) Filed: Mar. 12, 2009

(65) Prior Publication Data
US 2010/0234057 A1     Sep. 16, 2010

(51) Int. Cl.
*H04B 7/00* (2006.01)
(52) U.S. Cl. .................. 455/518; 455/463; 370/261
(58) Field of Classification Search .......... 370/260–263; 455/412.2, 418, 463, 571–519, 521
See application file for complete search history.

(56) References Cited

U.S. PATENT DOCUMENTS

| 7,787,879 B1 * | 8/2010 | Philips et al. | 455/435.1 |
| 7,865,205 B1 * | 1/2011 | Lundy et al. | 455/518 |
| 7,983,199 B1 * | 7/2011 | Nguyen et al. | 370/260 |
| 2006/0140200 A1 | 6/2006 | Black | |
| 2006/0234692 A1 | 10/2006 | Shimokawa et al. | |
| 2007/0081649 A1 | 4/2007 | Baudino et al. | |

FOREIGN PATENT DOCUMENTS
WO     2005051007 A1     6/2005

OTHER PUBLICATIONS

PCT International Search Report Dated Oct. 8, 2010.
Push to Talk Over Cellular Control Plane Specification; Sep. 5, 2007.
Jennings, et al. Private Extensions to the Session Initiation Protocol (SIP) for Asserted Identify Within Trusted Networks; RFC3325 http://www.ietf.org/rfc3325.txt; Nov. 2002.

* cited by examiner

*Primary Examiner* — Don Le
(74) *Attorney, Agent, or Firm* — Terri Hughes Smith; Valerie M. Davis

(57) ABSTRACT

A method and device for enabling selective privacy in a push to talk (PTT) wireless group communication session provides improved control over sharing of user identity information. The method includes processing at a PTT server a request for selective privacy. The PTT server then processes one or more selective privacy parameters, whereby at least a first session participant is enabled to receive an identification of a second session participant and a third session participant is not enabled to receive an identification of the second session participant. The PTT server then facilitates the PTT wireless group communication session between at least the first session participant, second session participant, and third session participant according to the one or more selective privacy parameters.

20 Claims, 7 Drawing Sheets

| Talk Group 200 Selective Privacy Parameters | User's ability to receive identity of other group members | | | | |
|---|---|---|---|---|---|
| | User 120-1 | User 120-2 | User 120-3 | User 120-4 | <non-group member> |
| Group Members User 120-1 | n/a | visible | visible | hidden | visible |
| User 120-2 | visible | n/a | hidden | hidden | visible |
| User 120-3 | visible | visible | n/a | hidden | visible |
| User 120-4 | visible | hidden | visible | n/a | hidden |
| <non-group member> | visible | hidden | hidden | hidden | hidden |

| Selective Privacy Parameter per User | During a Talk Group Call User's identity: | |
|---|---|---|
| | visible to other group members | hidden from other group members |
| User 120-1 | Group 1 | |
| User 120-2 | Group 1, Group 2, | Group 3 |
| User 120-3 | Group 2 | Group 1, Group 5 |
| ... | ... | ... |

US 8,099,120 B2

METHOD AND DEVICE FOR ENABLING SELECTIVE PRIVACY IN A PUSH TO TALK (PTT) WIRELESS GROUP COMMUNICATION SESSION

FIELD OF THE DISCLOSURE

The present invention relates generally to wireless communication networks, and in particular to enabling selective control over whether a participant's identity is revealed during a PTT wireless group communication session.

BACKGROUND

For many decades, half duplex two way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Many modern communications systems designed for public safety still typically allocate only one logical media stream in a network, which is shared among network participants. A floor control mechanism then dictates which device in the network is permitted to send media at a given time on a given stream.

Push-to-talk over cellular (PoC) is a recent technology that enables familiar PTT and "instant on" features of conventional half duplex radios, but uses mobile communication devices operating over modern cellular telecommunications networks. Using PoC, wireless communication devices such as mobile telephones and notebook computers can therefore function as PTT half-duplex radio devices for transmitting and receiving voice and/or data. Other types of PTT models and multimedia call models (MMCMs) are also available.

Floor control in a PoC session is generally maintained by a PTT server that controls communications between two or more wireless communication devices. When a user of one of the communication devices keys a PTT button, a request for permission to speak in the PoC session is transmitted from the user's device to the PTT server using, for example, a real-time transport protocol (RTP) message. If no other users are currently speaking in the PoC session, an acceptance message is transmitted back to the user's device and the user can then speak into a microphone of the device. Using standard compression/decompression (codec) techniques, the user's voice is digitized and transmitted using discrete voice data packets, such as according to RTP and internet protocols (IP), to the PTT server. The PTT server then transmits the voice data packets to other users of the PoC session, using for example a point to multipoint communication technique.

In some circumstances a user in a PTT session may seek to hide his or her identity from other participants in the PTT session. For example, during a public chat session, it may be preferable for a user to remain anonymous so that other participants in the session do not receive details of the user's identity, such as a user address defined by a session initiation protocol (SIP) uniform resource identifier (URI). Various PTT standards therefore include binary "on/off" privacy features. Such features enable a user either to hide the user's identity details from all participants in a PTT session, or to disclose the user's identity details to all participants in a PTT session.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a chart illustrating selective privacy parameters for each user relative to each other user in a talk group, according to some embodiments.

FIG. 4 is a chart illustrating a user's selective privacy parameters based on groups, according to some embodiments.

Figure 1:
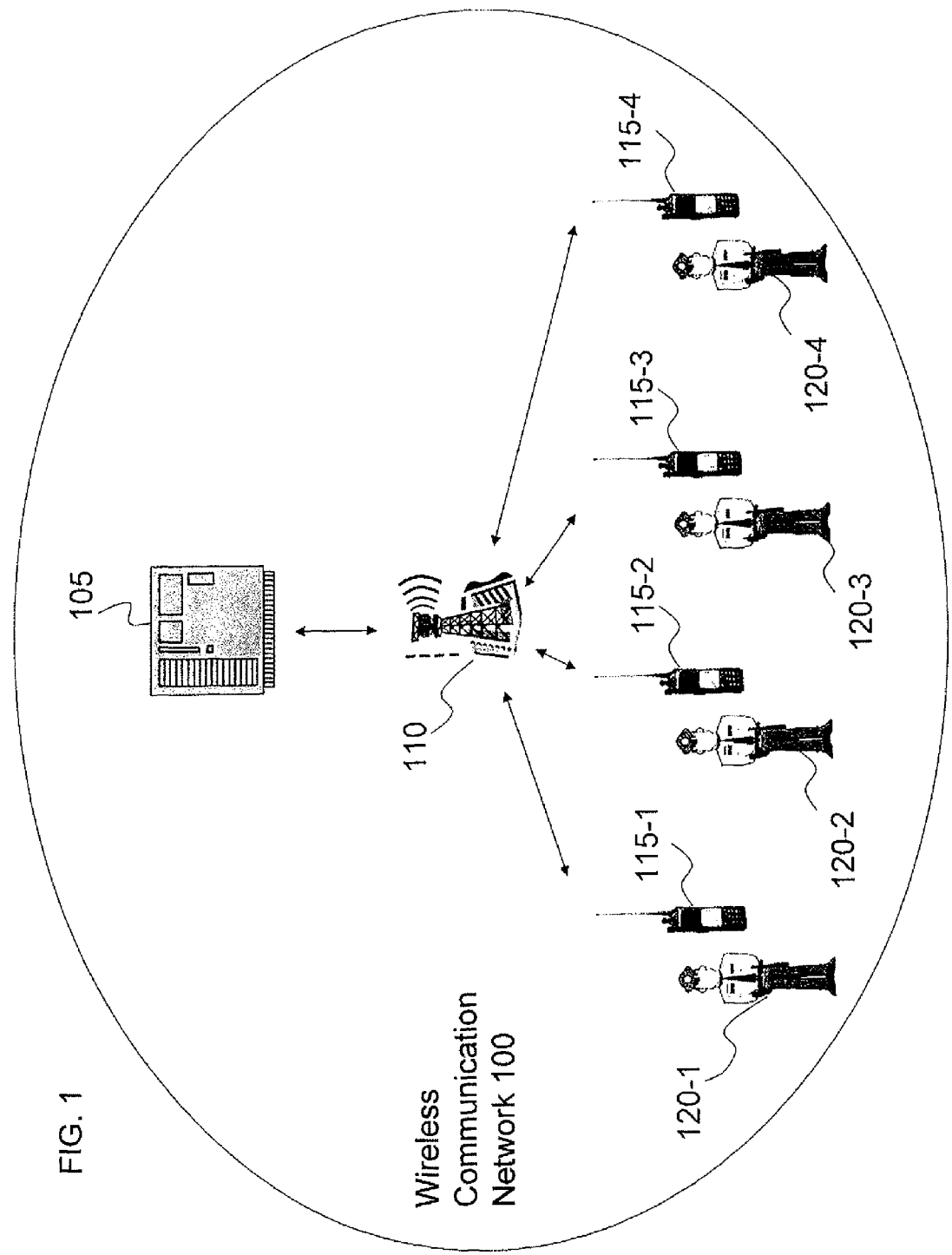
FIG. 1 is a network diagram illustrating elements of a wireless communication network, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method enables selective privacy in a PTT wireless group communication session. The method includes processing at a PTT server a request for selective privacy. The PTT server then processes one or more selective privacy parameters, whereby at least a first session participant is enabled to receive an identification of a second session participant and a third session participant is not enabled to receive an identification of the second session participant. The PTT server then facilitates the PTT wireless group communication session among at least the first, second, and third session participants according to the one or more selective privacy parameters.

Embodiments of the present invention thus enable participants that are involved in a PTT wireless group communication session and/or administrators to control how participant identification data are shared with other session participants. As described in detail below, such selective privacy control can be useful in various circumstances including, for example, public safety environments and other communication network environments where network users are classified according to various user status rankings or designations.

For example, consider the following scenario. A wireless communication network is operated by a police department. To facilitate investigation of a particular crime incident, such as a bank robbery, a PoC radio communication group may be established. The group may include patrol officers and detectives, and also secondary responders such as private security guards. Further, consider that during PTT wireless group communication sessions among the PoC group, the detectives prefer that their identities be revealed only to the patrol officers and not to the private security guards. A "permitted list" is therefore created for each detective, where each permitted list identifies all the officers and other detectives, but does not identify the private security guards. When a first detective then joins a PTT wireless group communication session with the PoC group, he or she may elect a "selective privacy" option for that particular session. Consequently, during that session the patrol officers and other detectives will be able to see an identity of the first detective as session participant information, but the private security guards will not be able to see the identity of the first detective.

Referring to FIG. 1, a network diagram illustrates elements of a wireless communication network 100, according to some embodiments of the present invention. The wireless communication network 100 includes a PTT server 105, a routing apparatus including a base station 110, and various radio devices 115-$n$. Each user 120-$n$ is then associated with a radio device 115-$n$ (such that, for example, user 120-1 operates radio device 115-1, and user 120-2 operates radio device 115-2, etc.). The PTT server 105 then enables a selective privacy function concerning the identities of the users 120-$n$ participating in a particular PTT wireless group communication session. The selective privacy function enables each user 120-$n$ to selectively determine which other users 120-$n$ will be able to receive his or her identity during the session.

Wireless communication devices and network devices, such as the radio devices 115-$n$ and the PTT server 105, that implement embodiments of the present invention can utilize various types of wireless network architectures including a mesh enabled architecture (MEA) network, or an Institute of Electrical and Electronics Engineers (IEEE) 802.11 network (e.g. 802.11a, 802.11b, 802.11g, 802.11n). (Note: for any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that such wireless communication networks can alternatively comprise any packetized communication network where packets are forwarded across multiple wireless hops. For example, such a wireless communication network can be a network utilizing multiple access schemes such as orthogonal frequency division multiple access (OFDMA), time division multiple access (TDMA), frequency division multiple access (FDMA), or carrier sense multiple access (CSMA).

Referring to FIG. 2, a chart illustrates selective privacy parameters for each user 120-$n$ relative to each other user 120-$n$ in a talk group 200, according to some embodiments of the present invention. Consider that all of the users 120-1, 120-2, 120-3, and 120-4 have been formed into the pre-arranged talk group 200, and each of these users 120-$n$ has informed the PTT server 105 whether his or her identity should be revealed to the other users 120-$n$ in the talk group 200. Alternatively, this information could have been provided by an administrator or the creator of the talk group. That information is summarized in the chart shown in FIG. 2.

For example, as shown by the first row of the column labeled "Group Members" in FIG. 2, the user 120-1 has previously provisioned that, during a PTT wireless group communication session, she would like her identity visible to a non-group member and to all other members of the talk group 200 except user 120-4. User 120-2 has previously provisioned that he would like his identity visible to a non-group member and to user 120-1, but hidden from users 120-3 and 120-4. User 120-3 has indicated that she would like her identity visible to a non-group member and to all other members of the talk group 200, except user 120-4. Selective privacy parameters for the user 120-4 and for a non-group member are also provided.

Thus, using the data from FIG. 2, the PTT server 105 is able to provide selective privacy to each of the users 120-$n$ in the talk group 200. The chart in FIG. 2 thus defines one form of a "permitted list" for each user 120-$n$ in the talk group 200, including selective privacy parameters that indicate whether a particular user is permitted to receive the identification of another user. The chart thus may be stored, for example, at the PTT server 105 as a pre-defined selective privacy profile for the talk group 200. Also, rather than creating a "permitted list", according to some embodiments it may be preferred to use a "not permitted list" that explicitly identifies users with whom an identity will not be shared.

When a PoC session is being established, the PTT server needs to know when to use the selective privacy parameters. One way to accomplish this is a user may explicitly request that selective privacy be used (as opposed to "full" privacy where no user identifications are disclosed, or "no" privacy where all user identifications are disclosed to all other users). Similarly, when joining a session a user may provide an indication regarding whether selective privacy should be used. Alternatively, a system or talk group can be configured so that selective privacy will always be used. For example, the talk group 200 could be provisioned such that selective privacy will always be used regardless of what is requested by a particular user.

Figure 3:
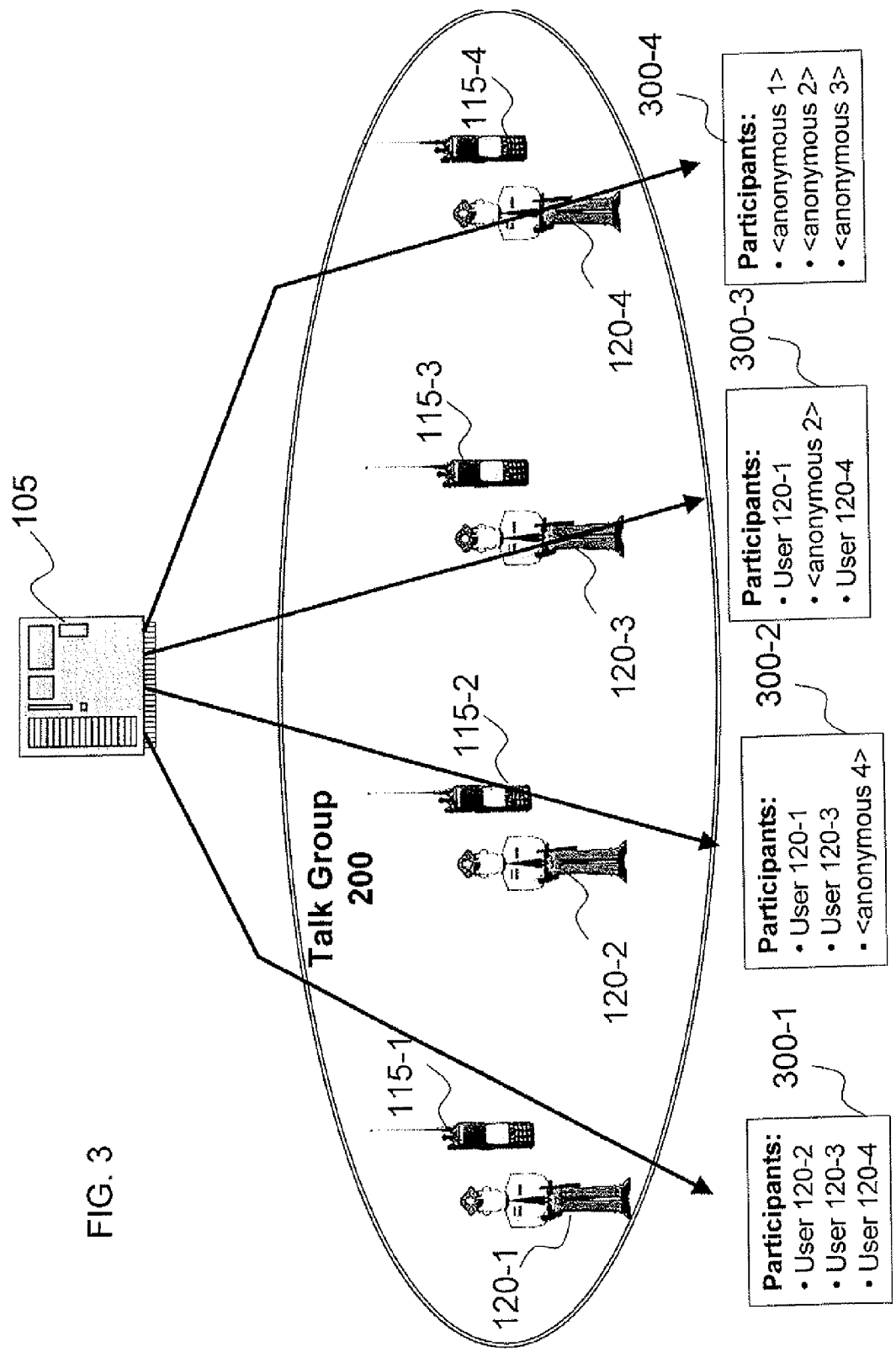
FIG. 3 is a network diagram illustrating a dissemination of participant identification data in a PTT wireless group communication session in a wireless communication network, according to the selective privacy parameters provided in the chart shown in FIG. 2.

Referring to FIG. 3, a network diagram illustrates a dissemination of participant identification data in a PTT wireless group communication session in the wireless communication network 100, according to the selective privacy parameters provided in the chart shown in FIG. 2. Blocks 300-1, 300-2, 300-3, and 300-4 illustrate the participant identification data that are provided by the PTT server 105 to each of the users 120-1, 120-2, 120-3, and 120-4, respectively, when voice or non-voice data are transmitted from the PTT server 105 to the talk group 200.

For example, block 300-1 indicates that the user 120-1 will be able to see the identity of all of the other group members participating in the talk group 200. Block 300-1 conforms to the selective privacy parameters shown in the first column in FIG. 2 under "User's ability to receive identity of other group members", where all of the users 120-2, 120-3, and 120-4 have indicated that they prefer their identity to be visible to the user 120-1. Also, block 300-2 indicates that the user 120-2 will be able to see the identity of user 120-1 and user 120-3, but the identity of user 120-4 is hidden. Block 300-2 conforms to the selective privacy parameters shown in the second column in FIG. 2, where the users 120-1 and 120-3 have indicated that they prefer their identity to be visible to the user 120-2; but the user 120-4 has indicated that he prefers his identity to be hidden from the user 120-2.

As will be understood by those having ordinary skill in the art, the data provided in the blocks 300-*n* may be presented to the users 120-*n* in various ways. For example, a display screen on the radio 115-1 may display all the data shown in block 300-1 during a PTT wireless group communication session involving the talk group 200. Alternatively, only the identification data concerning a user 120-*n* who presently maintains "floor control", such as when speaking to the talk group 200, may be displayed on the radios 115-*n* of the other users 120-*n* in the talk group 200. Still another example concerns session initiation, when the identifier of a session originator may or may not be shown to invited session targets based on selective privacy parameters.

Further, some embodiments of the present invention may enable users to define various types of identification data that can be provided to other users in a PTT wireless group communication session. For example, users may choose to be identified by a user number, a nick name, a rank (such as "lieutenant"), an affiliated group name (such as "NYPD"), or various other types of identifications. Such identifications then may be defined as selective privacy parameters included in a permitted list, such as in the chart shown in FIG. 2.

Referring to FIG. 4, a chart illustrates selective privacy parameters for a user based on groups, according to some embodiments of the present invention. For example, the chart indicates that during a PoC session involving members from a group 1, the identity of user 120-1 should be visible to all other members of the group 1 participating in the PoC session. The chart also indicates that during a PoC session involving members from a group 3, the identity of user 120-2 should be hidden from all members of the group 3 participating in the PoC session. The chart may be stored, for example, at the PTT server 105 as a pre-defined selective privacy profile for the user 120-*n*. Also, selective privacy parameters can be automatically generated based on other identity parameters associated with session participants. For example, such identity parameters can include a domain name associated with a session participant, where a session participant may indicate that he wants his identity provided to all other session participants affiliated with a particular domain name.

Of course, in light of the present disclosure, those having ordinary skill in the art will appreciate that various other sources or definitions of selective privacy parameters can be used. Such sources or definitions may include a user's agency, rank, location or other status, or general factors such as a time of day, incident type, or incident priority. For example, all users above a certain rank may have full access to identification information of all other users during a PoC session, and users below a certain rank may have only selective access to the identification information of other users during the PoC session. Thus, various "rules" can be applied to determine whether a particular session participant will be able to receive an identification of another session participant. For example, even a request for selective privacy may be generated at a PTT server or other network entity based on various "rules". Further, rules may govern whether one request for selective privacy should override another request for selective privacy. For example, a talk group normally may be configured to use selective privacy; however, when the talk group becomes associated with a high priority incident either selective privacy may be disabled or a different set of selective privacy parameters may be used.

Figure 5:
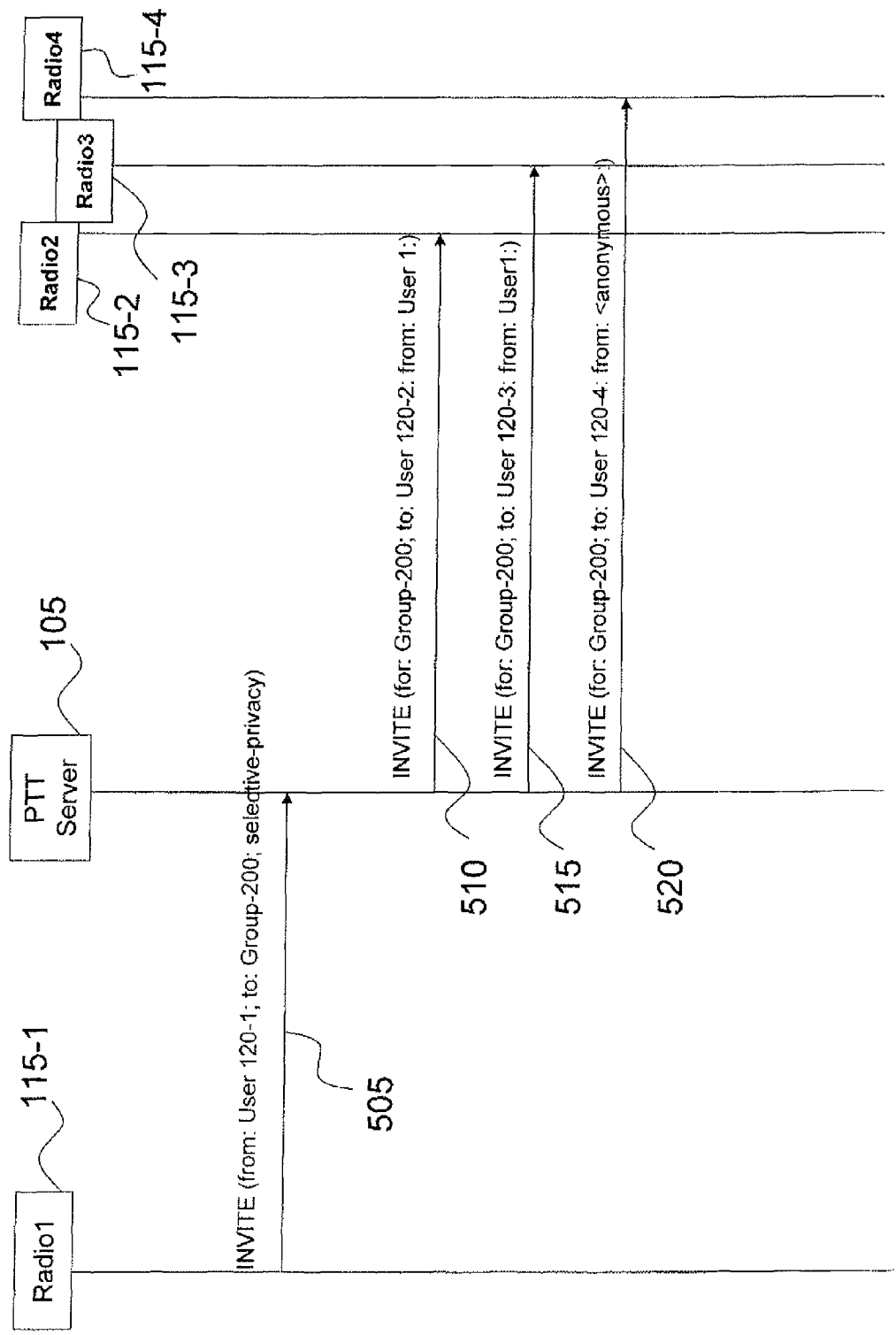
FIG. 5 is a message sequence chart illustrating exemplary SIP messages that may be used to establish a PTT wireless group communication session, according to some embodiments.

Referring to FIG. 5, a message sequence chart illustrates exemplary SIP messages that may be used to establish a PTT wireless group communication session, according to some embodiments of the present invention. For example, consider that the user 120-1 functions as an originator of the talk group 200. The radio device 115-1 thus transmits a SIP INVITE message 505 to the PTT server 105. The SIP INVITE message 505 identifies the talk group 200 and includes a selective privacy request that indicates the user 120-1 seeks to employ selective privacy during the session.

Next, the PTT server 105 transmits SIP INVITE messages 510, 515, 520 to each of the radio devices 115-2, 115-3, 115-4, respectively, which comprise the other members of the talk group 200 and the session targets for the current PTT wireless communication session. The SIP INVITE messages 510, 515, 520 include, for example, the identifications defined according to the selective privacy parameters of FIG. 2.

Figure 6:
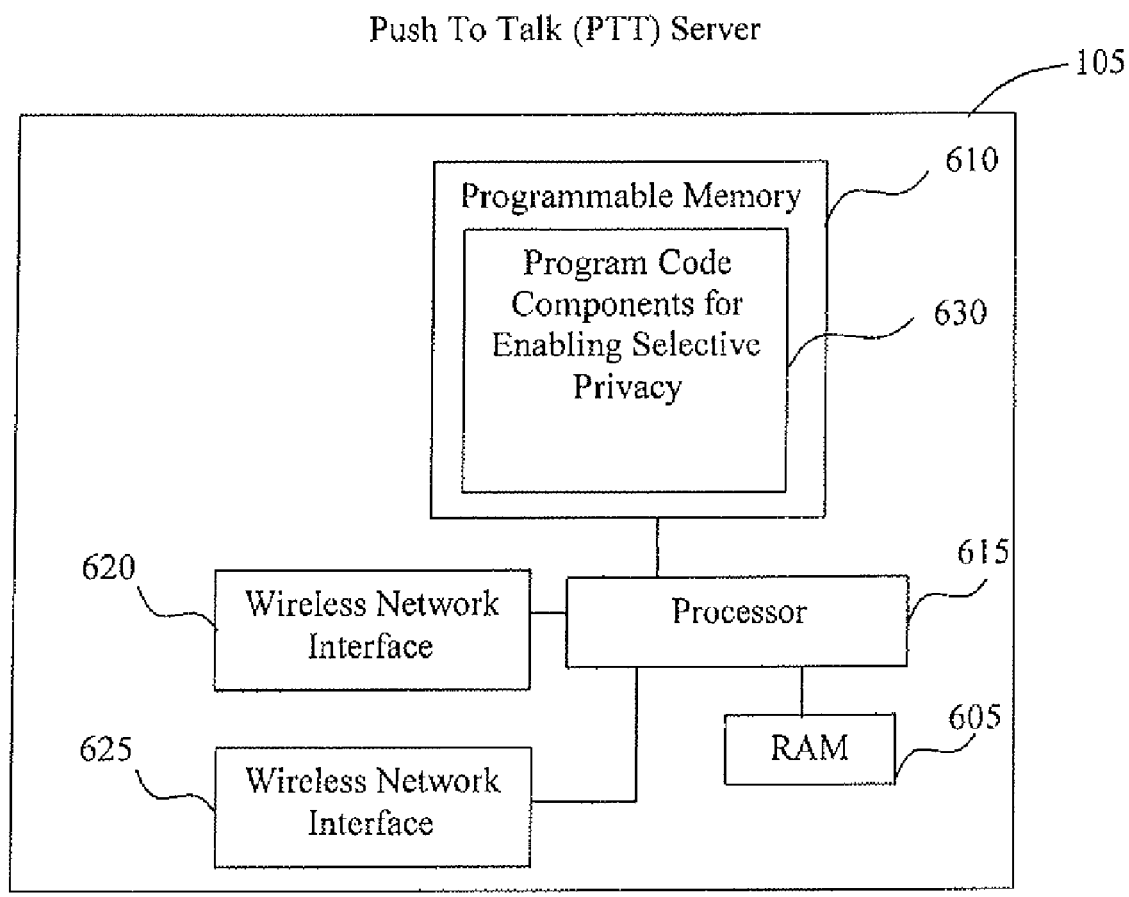
FIG. 6 is a block diagram illustrating components of a push to talk (PTT) server, according to some embodiments.

Referring to FIG. 6, a block diagram illustrates components of the PTT server 105, according to some embodiments of the present invention. The PTT server 105, for example, can be included in various types of devices, including an integrated unit such as a computer, a mobile telephone, or a personal digital assistant (PDA) containing at least all the elements depicted in FIG. 6, as well as any other elements necessary for the PTT server 105 to perform its particular functions. Alternatively, the PTT server 105 can comprise a collection of appropriately interconnected units or devices, wherein such units or devices perform functions that are equivalent to the functions performed by the elements depicted in FIG. 6.

The PTT server 105 comprises a random access memory (RAM) 605 and a programmable memory 610 that are coupled to a processor 615. The processor 615 also has ports for coupling to network interfaces 620, 625. The network interfaces 620, 625, which for example may be wireless network interfaces, can be used to enable the PTT server 105 to communicate with other devices in the wireless communication network 100.

The programmable memory 610 can store operating code (OC) for the processor 615 and code for performing functions associated with a network device. For example, the programmable memory 610 can store computer readable program code components 630 configured to cause execution of a method for enabling selective privacy in a PTT wireless communication session, as described herein.

Figure 7:
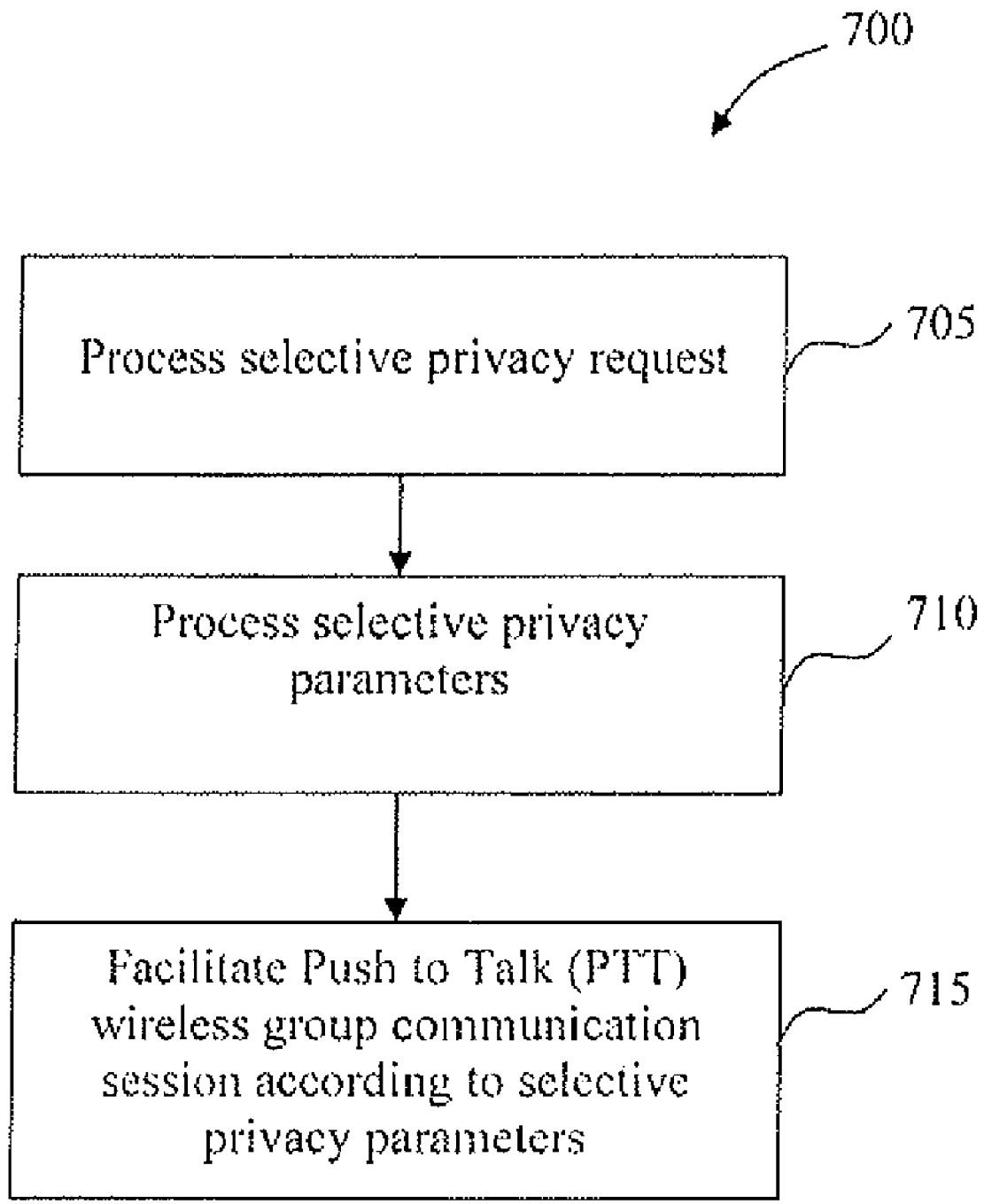
FIG. 7 is a general flow diagram illustrating a method for enabling selective privacy in a PTT wireless group communication session, according to some embodiments.

Referring to FIG. 7, a general flow diagram illustrates a method 700 for enabling selective privacy in a PTT wireless group communication session, according to some embodiments of the present invention. At step 705, a PTT server processes a request for selective privacy. For example, the request for selective privacy may be included in various types of messages received from a session originator, such as in the SIP INVITE message 505. Alternatively, the request for selective privacy can be included in a message received from a session target, such as a SIP 200 OK message, or from an administrative source that does not participate in the PTT wireless group communication session. Thus, the request for selective privacy generally can be processed at anytime during a session, including when a session is first established or when a current transmitter is identified. Also, as discussed herein, a request for selective privacy can be automatically generated according to various network rules.

At step 710, the PTT server processes one or more selective privacy parameters, whereby at least a first session participant is enabled to receive an identification of a second session participant and a third session participant is not enabled to receive the identification of the second session participant. For example, the selective privacy parameters may include data such as that shown in the chart in FIG. 2. The first session participant may be represented by the user 120-1 who is enabled to receive the identification of the second session participant represented by the user 120-2. Further, the third session participant represented by the user 120-3 may not be able to receive the identification of the second session participant represented by the user 120-2.

At step 715, the PTT server facilitates the PTT wireless group communication session between at least the first, second, and third session participants according to the one or more selective privacy parameters. For example, as shown in FIG. 5, the PTT server 105 may facilitate a PTT wireless group communication session between members of the talk group 200 by transmitting the SIP INVITE messages 510, 515, 520 to the session targets comprising the radio devices 115-2, 115-3, and 115-4, respectively, where the SIP INVITE messages 510, 515, 520 conform to the selective privacy parameters shown in FIG. 2.

Advantages of some embodiments of the present invention therefore include enabling participants or administrators involved in a PTT wireless group communication session to control how participant identification data are shared with other session participants. Such selective privacy control can be useful in various circumstances including, for example, public safety environments and other communication network environments where network users are classified according to various user status rankings or designations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g. comprising a processor) to perform a method as described and claimed herein. Examples of such computer-readable storage mediums include, but are not limited to, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling selective privacy in a push to talk (PTT) wireless group communication session, the method comprising:

processing at a PTT server a request for selective privacy;

processing at the PTT server one or more selective privacy parameters, whereby at least a first session participant is enabled to receive an identification of a second session participant and a third session participant is not enabled to receive an identification of the second session participant; and facilitating at the PTT server the PTT wireless group communication session among at least the first session participant, second session participant, and third session participant according to the one or more selective privacy parameters.

2. The method of claim 1, wherein the one or more selective privacy parameters comprise an identification of the first session participant in a permitted list.

3. The method of claim 1, wherein the one or more selective privacy parameters comprise an identification of the third session participant in a not permitted list.

4. The method of claim 1, wherein the request for selective privacy is received from the second session participant.

5. The method of claim 1, wherein the one or more selective privacy parameters are automatically generated based on identity parameters associated with the first session participant, second session participant, or third session participant.

6. The method of claim 5, wherein the identity parameters include a domain name associated with the first, second, or third session participant.

7. The method of claim 1, wherein the one or more selective privacy parameters are included in a pre-defined selective privacy profile.

8. The method of claim 1, wherein the request for selective privacy is received from a PTT wireless group communication session originator or session target.

9. The method of claim 1, wherein the PTT server is a push to talk over cellular (PoC) server.

10. The method of claim 1, wherein the request for selective privacy is received from a session participant or is generated by the PTT server.

11. A push to talk (PTT) server, comprising:
a processor; and
a memory coupled to the processor, wherein the memory includes:
computer readable program code components for processing a request for selective privacy;
computer readable program code components for processing one or more selective privacy parameters, whereby at least a first session participant is enabled to receive an identification of a second session participant and a third session participant is not enabled to receive an identification of the second session participant; and
computer readable program code components for facilitating a PTT wireless group communication session between at least the first, second, and third session participants according to the one or more selective privacy parameters.

12. The server of claim 11, wherein the one or more selective privacy parameters comprise an identification of the first session participant in a permitted list.

13. The server of claim 11, wherein the one or more selective privacy parameters comprise an identification of the third session participant in a not permitted list.

14. The server of claim 11, wherein the request for selective privacy is received from the second session participant.

15. The server of claim 11, wherein the one or more selective privacy parameters are automatically generated based on identity parameters associated with the first session participant, second session participant, or third session participant.

16. The server of claim 15, wherein the identity parameters include a domain name associated with the first, second, or third session participant.

17. The server of claim 11, wherein the one or more selective privacy parameters are included in a pre-defined selective privacy profile.

18. The server of claim 11, wherein the request for selective privacy is received from a PTT wireless group communication session originator or session target.

19. The server of claim 11, wherein the server is a push to talk over cellular (PoC) server.

20. A push to talk (PTT) server, comprising:
means for processing a request for selective privacy;
means for processing one or more selective privacy parameters, whereby at least a first session participant is enabled to receive an identification of a second session participant and a third session participant is not enabled to receive an identification of the second session participant; and
means for facilitating a PTT wireless group communication session between at least the first, second, and third session participants according to the one or more selective privacy parameters.

* * * * *